(12) United States Patent  
Wyss et al.

(10) Patent No.: US 8,652,230 B2  
(45) Date of Patent: Feb. 18, 2014

(54) MEDIA FOR HOT GAS FILTRATION

(75) Inventors: Kurt Hans Wyss, Chavannes de Bogis (CH); Cheng-Hang Chi, Midlothian, VA (US)

(73) Assignee: E I du Pont de Nemours and Company, Wilmington, DE (US)

(*) Notice: Subject to any disclaimer, the term of this patent is extended or adjusted under 35 U.S.C. 154(b) by 51 days.

(21) Appl. No.: 13/314,672

(22) Filed: Dec. 8, 2011

(65) Prior Publication Data

US 2012/0311977 A1    Dec. 13, 2012

Related U.S. Application Data

(60) Provisional application No. 61/420,986, filed on Dec. 8, 2010.

(51) Int. Cl.  
*B01D 46/00* (2006.01)

(52) U.S. Cl.  
USPC ............... 55/528; 55/361; 55/486; 55/527; 96/69

(58) Field of Classification Search  
USPC .................. 55/361, 486, 527–528; 96/69  
See application file for complete search history.

(56) References Cited

U.S. PATENT DOCUMENTS

| | | |
|---|---|---|
| 2,910,763 A | 11/1959 | Lauterbach |
| 3,063,966 A | 11/1962 | Kwolek et al. |
| 3,227,793 A | 1/1966 | Cipriani |
| 3,287,324 A | 11/1966 | Sweeny |
| 3,414,645 A | 12/1968 | Morgan, Jr. |
| 3,508,308 A | 4/1970 | Bunting, Jr. et al. |
| 3,524,304 A | 8/1970 | Wittemeier et al. |
| 3,684,284 A | 8/1972 | Tranfield |
| 4,056,374 A | 11/1977 | Hixenbaugh |
| 4,310,336 A | 1/1982 | Peterson |
| 4,481,022 A | 11/1984 | Reier |
| 4,490,253 A | 12/1984 | Tafara |
| 4,585,833 A | 4/1986 | Domeier |
| 5,667,743 A | 9/1997 | Tai et al. |
| 2004/0255783 A1* | 12/2004 | Graham et al. ................. 96/69 |
| 2010/0119794 A1 | 5/2010 | Manstein et al. |

FOREIGN PATENT DOCUMENTS

| | | |
|---|---|---|
| DE | 102007023806 | 11/2008 |
| JP | 2001336050 | 12/2001 |
| JP | 2005171415 | 6/2005 |

\* cited by examiner

*Primary Examiner* — Jason M Greene  
*Assistant Examiner* — Karla Hawkins

(57) ABSTRACT

A filter fabric having improved filtering properties for hot gas filtration containing a nonwoven aramid mat The mat has a basis weight of at least 9.7 ounces per square yard (330 grams per square meter) and is characterized by a pore size distribution in which the number of pores in a given range as measured by ASTM F316-03 test method is plotted against pore size. In a preferred embodiment, the percentage of pores having a size in between 10 and 26 microns is greater than 50% while the percentage of pores having a size of greater than 50 microns is less than 0.5%.

1 Claim, 1 Drawing Sheet

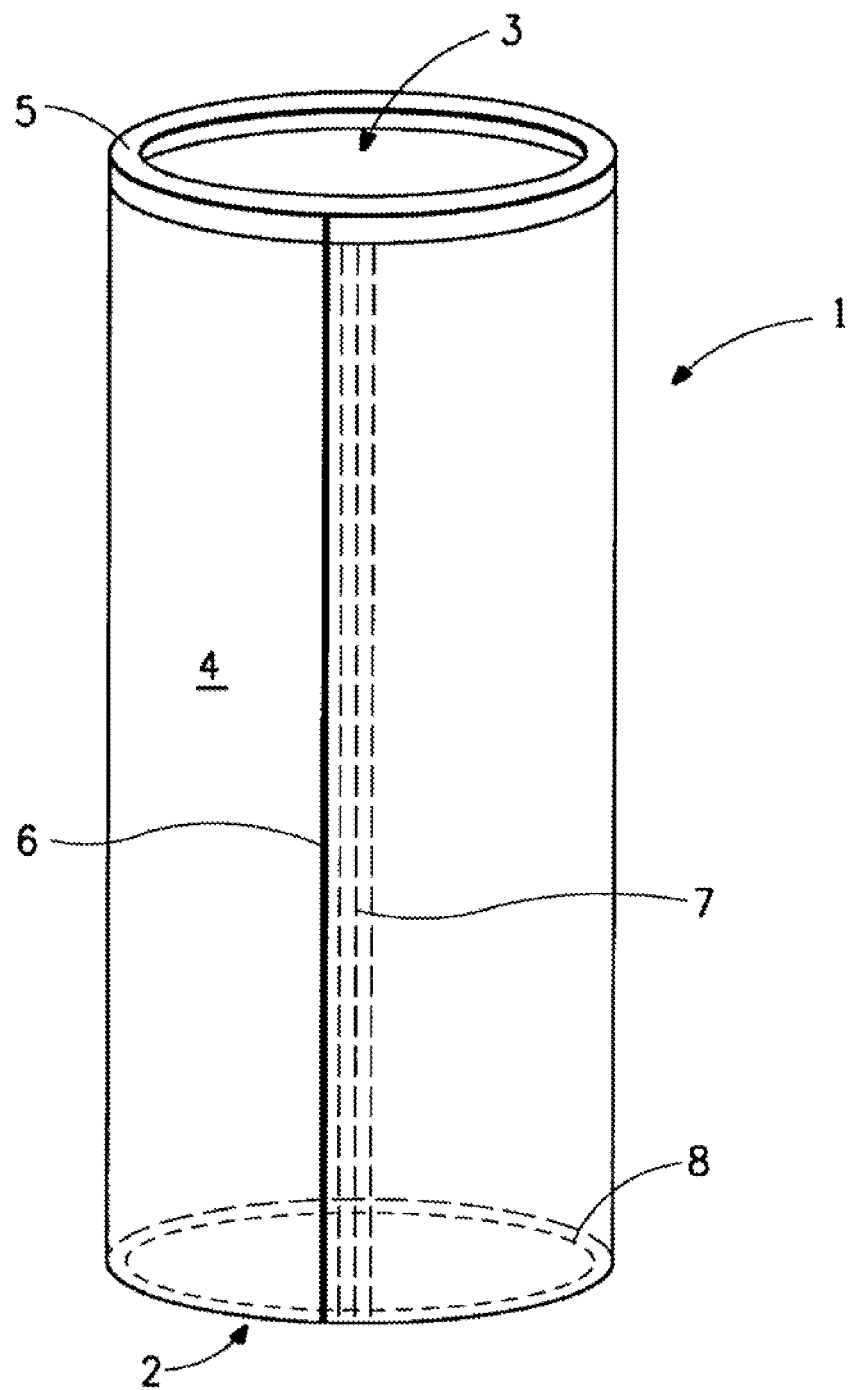

MEDIA FOR HOT GAS FILTRATION

BACKGROUND OF THE INVENTION

The use of fabric filters has grown significantly as environmental standards for particulate emissions have become more stringent. Fabric filters are used because they are highly efficient, easily operated and in many cases the least expensive method of control of such emissions. Filter bag fabric is of extreme importance since one fabric may function much better than another fabric in the same environment. New filter fabric constructions of improved filtering capacity is a desirable goal. The present invention is for a filter fabric and a filter with improved efficiency at a given pressure drop over existing fabrics and filters.

SUMMARY OF THE INVENTION

The present invention provides a fabric with improved filtering properties for hot gas filtration. It comprises a nonwoven mat of high temperature fibers such as aramid or polyarylene sulfide fibers, said mat having a basis weight of at least 9.0 ounces per square yard (305 grams per square meter–gsm.) The mat is characterized by a pore size distribution in which the percentage of the flow in a given range as measured by ASTM F316-03 is plotted against pore size. The percentage of pores having a size in between 10 and 26 microns is greater than 50% while the percentage of pores having a size of greater than 50 microns is less than 0.5%.

The present invention is also directed to a filter assembly comprising the fabric.

BRIEF DESCRIPTION OF THE DRAWINGS

FIG. 1 is an illustration of one embodiment of a filter bag according to the present invention.

DETAILED DESCRIPTION OF THE INVENTION

Definitions

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials.

The terms "spunlaced" and "hydroentangled" are synonymous herein. As used herein, the term "spunlaced" when applied to a mat, fabric or web refers to a web of material consisting of one or more types of preferably non-continuous fibers, where the fibers are hydroentangled to achieve mechanical bonding without binder materials or thermal bonding. As used herein, the term "hydroentangle" or "hydroentangling" refers to a process wherein a web of material consisting of one or more types of fibers or filaments are subjected to high-velocity water jets, which entangle the fibers to achieve mechanical bonding. The spunlaced processes disclosed in U.S. Pat. Nos. 3,508,308 and 3,797,074 are examples of methods known in the art that are useful in the manufacture of the nonwoven fabrics and felt.

"Needlepunching" refers to a form of mechanical bonding of fibers which have normally been produced by a card or other equipment. The process converts the web of loose fibers into a coherent nonwoven fabric using a needle loom. Needle looms of various types are well known in the art and function to bond a nonwoven web by mechanically orienting fibers through the web. The process is called needling, or needlepunching. Barbed needles, set into a board, punch fiber into the batt and withdraw, leaving the fibers entangled. The needles are spaced in a nonaligned arrangement. By varying the strokes per minute, the number of needles per loom, the advance rate of the batt, the degree of penetration of the needles, and the weight of the batt, a wide range of fabric densities can be made. The needle loom can be operated to produce patterned or unpatterned products.

The needlepunching processes disclosed in U.S. Pat. Nos. 2,910,763 and 3,684,284 are examples of methods known in the art that are useful in the manufacture of the nonwoven fabrics and felt.

Description of the Preferred Embodiments

The present invention provides a fabric with improved filtering properties for hot gas filtration. It comprises a nonwoven mat of high temperature fibers such as aramid or Polyarylene sulfide fibers, said mat having a basis weight of at least 9.0 ounces per square yard (305 grams per square meter–gsm.) The mat is characterized by a pore size distribution in which the percentage of the flow in a given range as measured by ASTM F316-03 test method is plotted against pore size. The percentage of pores having a size in between 10 and 26 microns is greater than 50% while the percentage of pores having a size of greater than 50 microns is less than 0.5%.

The present invention is also directed to a filter assembly comprising the fabric. In dust-cake or surface filtration applications, it was discovered that filtration fabrics and filters incorporating the present invention gave high filtration efficiency (low dust leakage) and low pressure drop. The purpose of the present invention is to provide a fabric with relatively uniform pore size distribution as well as minimum amount of large pores. It is anticipated that more uniform pores will lead to more uniform cake loading and air flow, resulted in lower pressure drop across the filter. By reducing the amount of large pores, one can minimize the detrimental effect of dust leakage through the large pores while the dust cake is already accumulating on the smaller pores. The end result is higher filtration efficiency and lower dust leakage throughout the entire cake filtration cycles.

The fiber mat can be formed by conventional methods. For example, in one embodiment clumps of crimped staple fibers obtained from bales of fiber can be opened by a device such as a picker and then blended by any available method, such as air conveying. The fibers can then be converted into a nonwoven fabric or felt using conventional methods as mentioned previously. Generally this involves forming a fibrous web by use of a device such as a card, although other methods, such as air-laying or wet-laying of the fibers may be used. If desired, the fibrous web can then be sent via conveyor to a device such as a crosslapper to create a crosslapped structure by layering individual webs on top of one another in a zigzag structure.

In a preferred embodiment the mat is formed by hydroentangling of the fibers. To produce a hydroentangled (spunlaced) structure for technical application such as hot gas filtration application, it is necessary to obtain a basis weight of at least 330 g/m2. The conventional hydroentangled machine can typically obtain fabric of less than 135 g/m2. In recent years, water jet intermingled equipments were further advanced so that heavier filtration media basis weight can be achieved on such machines.

The preparation of the bulky fiber batts needed for densification of the final non woven structure, can be the same for both techniques (needle punching and/or spunlacing). Instead of a cross lapper a fiber air-lay system can be used as well, where the single web is prepared to weight and isotropic fiber direction of the final batt prior densification. Therefore the key difference between needle punching and spunlacing is the densification step. Where as in needle felting, the densification is made by using barbed metal needles, spunlacing densifies the batt with a water curtain produced with thousands of tiny water jets.

The meta-aramid fiber useful in this invention includes meta-oriented synthetic aromatic polyamides. The polymers must be of fiber-forming molecular weight in order to be shaped into fibers. The polymers can include polyamide homopolymers, copolymers, and mixtures thereof which are predominantly aromatic, wherein at least 85% of the amide (—CONH—) linkages are attached directly to two aromatic rings. The rings can be unsubstituted or substituted. The polymers are meta-aramid when the two rings or radicals are meta oriented with respect to each other along the molecular chain. Preferably copolymers have no more than 10 percent of other diamines substituted for a primary diamine used in forming the polymer or no more than 10 percent of other diacid chlorides substituted for a primary diacid chloride used in forming the polymer. Additives can be used with the aramid; and it has been found that up to as much as 13 percent by weight of other polymeric material can be blended or bonded with the aramid. The preferred meta-aramids are poly (metaphenylene isophthalamide) (MPD-I) and its copolymers. One such meta-aramid fiber is Nomex® aramid fiber available from E. I. du Pont de Nemours and Company of Wilmington, Del., however, meta-aramid fibers are available in various styles under the trademarks Tejinconex®, available from Teijin Ltd. of Tokyo, Japan; New Star® Meta-aramid, available from Yantai Spandex Co. Ltd, of Shandong Province, China; and Chinfunex® Aramid 1313 available from Guangdong Charming Chemical Co. Ltd., of Xinhui in Guangdong, China. Meta-aramid fibers are inherently flame resistant and can be spun by dry or wet spinning using any number of processes; however, U.S. Pat. Nos. 3,063,966; 3,227,793; 3,287,324; 3,414,645; and 5,667,743 are illustrative of useful methods for making aramid fibers that could be used in this invention.

The para-aramid fiber useful in this invention includes aramid polymer, that is, a long-chain synthetic polyamide in which 85% or more of the amide linkages are attached directed to two aromatic rings. These aramids are well-known and readily available commercially from, for example, DuPont, of Wilmington, Del., which markets one such product under the trademark KEVLAR. Another aramid is available under the trademark TWARON, from the Twaron BV division of the Teijin Group.

Blends of meta-aramid fiber and para-aramid fiber can also be used in this invention.

The Polyarylene sulfides (PAS) useful in the invention include linear, branched or cross linked polymers that include arylene sulfide units. Polyarylene sulfide polymers and their synthesis are known in the art and such polymers are commercially available.

Exemplary polyarylene sulfides useful in the invention include polyarylene thioethers containing repeat units of the formula —[(Ar$^1$)$_n$—X]$_m$—[(Ar$^2$)$_i$—Y]$_j$—(Ar$^3$)$_k$—Z]$_l$—[(Ar$^4$)$_o$—W]$_p$— wherein Ar$^1$, Ar$^2$, Ar$^3$, and Ar$^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units Ar$^1$, Ar$^2$, Ar$^3$, and Ar$^4$ may be selectively substituted or unsubstituted. Advantageous arylene systems are phenylene, biphenylene, naphthylene, anthracene and phenanthrene. The polyarylene sulfide typically includes at least 30 mol %, particularly at least 50 mol % and more particularly at least 70 mol % arylene sulfide (—S—) units. Preferably the polyarylene sulfide polymer includes at least 85 mol % sulfide linkages attached directly to two aromatic rings. Advantageously the polyarylene sulfide polymer is polyphenylene sulfide (PPS), defined herein as containing the phenylene sulfide structure —(C$_6$H$_4$—S)$_n$— (wherein n is an integer of 1 or more) as a component thereof.

A polyarylene sulfide polymer having one type of arylene group as a main component can be preferably used. However, in view of processability and heat resistance, a copolymer containing two or more types of arylene groups can also be used. A PPS resin comprising, as a main constituent, a p-phenylene sulfide recurring unit is particularly preferred since it has excellent processability and is industrially easily obtained. In addition, a polyarylene ketone sulfide, polyarylene ketone ketone sulfide, polyarylene sulfide sulfone, and the like can also be used.

Specific examples of possible copolymers include a random or block copolymer having a p-phenylene sulfide recurring unit and an m-phenylene sulfide recurring unit, a random or block copolymer having a phenylene sulfide recurring unit and an arylene ketone sulfide recurring unit, a random or block copolymer having a phenylene sulfide recurring unit and an arylene ketone ketone sulfide recurring unit, and a random or block copolymer having a phenylene sulfide recurring unit and an arylene sulfone sulfide recurring unit.

The polyarylene sulfides may optionally include other components not adversely affecting the desired properties thereof. Exemplary materials that could be used as additional components would include, without limitation, antimicrobials, pigments, antioxidants, surfactants, waxes, flow promoters, particulates, and other materials added to enhance processability of the polymer. These and other additives can be used in conventional amounts.

FIG. 1 illustrates one embodiment of the filter bag of this invention. Filter bag 1 has a closed end 2, an open end 3, and a tubular section 4. In the embodiment represented, the filter bag also has a spring steel metal snap ring 5 attached to the open end of the bag. The tubular section 4 of this bag is comprised of a filtration felt that is overlapped, forming a seam 6 sewn with triple stitching 7. The closed end of the bag in this embodiment is also comprised of a filtration felt that is stitched at 8 to the end of the felt used for the tubular section. While the FIG. 1) represents a preferred embodiment, other potential constructions, orientations, and features of bag filters may be used, such as those disclosed in U.S. Pat. No. 3,524,304 to Wittemeier et al.; U.S. Pat. No. 4,056,374 to Hixenbaugh; U.S. Pat. No. 4,310,336 to Peterson; U.S. Pat. No. 4,481,022 to Reier; U.S. Pat. No. 4,490,253 to Tafara; and/or U.S. Pat. No. 4,585,833 to Tafara.

In some embodiments the closed end 2 of the filter bag, as shown in the FIG. 1), is a disk of filter material sewn to the tubular section. In some other embodiments the closed end can be made of some other material, for example in some situations a metallic closed end might be needed. In other embodiments the closed end can be ultrasonically, adhesively, or heat seamed or sealed in some other manner than sewing. In another embodiment the felt used in the tubular section of the bag can be gathered together or folded, and then sealed, to form the closed end.

In some embodiments the open end 3 of the bag may be provided with hardware to attach the bag to the cell plate. In some other embodiments the open end of the bag may be sized such that a snug fit is accomplished by sliding the bag over a specially designed cell plate.

In some embodiments of this invention the filtration material used in the tubular section 4 and optionally in the closed end 2 is a nonwoven fabric or felt. The nonwoven fabric or felt can be made by conventional nonwoven sheet forming processes, including processes for making air-laid nonwovens, wet-laid nonwovens, or nonwovens made from carding equipment; and such formed sheets can be consolidated into fabrics via spunlacing, hydrolacing, needlepunching, or other processes which can generate a nonwoven sheet. The spunlaced processes disclosed in U.S. Pat. Nos. 3,508,308 and 3,797,074; and the needlepunching processes disclosed in U.S. Pat. Nos. 2,910,763 and 3,684,284 are examples of conventional methods well known in the art that are useful in the manufacture of the nonwoven fabrics and felt.

In some preferred embodiments, the nonwoven felt is a needledpunched felt. In some other preferred embodiments, the nonwoven felt is a spunlaced felt. The basis weight of the felt is typically greater than 9 ounces per square yard (305 gsm), and in a preferred embodiment is greater than 12 ounces per square yard. (405 gsm). In some embodiments the tubular section 4 and optionally in the closed end 2 of the filter bag of this invention is a single layer of filtration material. In some other embodiments, the tubular section is made of a filtration material supported by a scrim or reinforcing cloth that provides stability during pulsing of the bag. In some preferred embodiments, the nonwoven felt includes a supporting woven scrim that is made with fibers that are compatible with the staple fibers in the felt. One type of this felt can be made using standard carding and cross lapping equipment to convert staple fibers into crosslapped batts having basis weights of 9 ounces per square yard or greater (305 grams per square meter.) If desired the batts can then be tacked or lightly consolidated, for example, on a standard needle punch machine. Two or more of these batts can then be positioned on either side of a woven scrim having a basis weight of about 1 to 4 ounces per square yard (34 to 135 grams per square meter) preferably about 2 ounces per square yard (70 grams per square meter), and the three layers are needled punched several times on both sides to produce filtration felts. In some preferred embodiments, the woven scrim comprises polyphenylene sulfide fibers, meta-aramid fibers, or mixtures thereof.

In a preferred embodiment shown in FIG. 1, the filtration material is overlapped to form a cylinder of filter material having a seam 6 that is then stitched with a high temperature thread, such as a thread having 3 to 6 strand plies of meta-aramid fiber, fluoropolymer fiber, glass fiber, or combinations or blends thereof. In other embodiments, the overlapped seam can be sealed by ultrasonics, adhesives, heat, or some combination of all these seaming methods.

Test Methods

Pore Size Distribution

The pore size distribution of filtration material was measured according to ASTM F 316-03 "Standard Test Methods for Pore Size Characteristics of Membrane Filters by Bubble Point and Mean Flow Pore Test.". Although this standard is specified for membrane filter media, the technique has been used by the nonwoven industry for many years. The equipment used was a capillary flow porometer made by PMI, Model Number CFP-2100AE. The filter sample diameter was 1.91 cm and the wetting fluid used was Galwick from PMI.

The dry and wet flow curves were obtained using the dry up/wet up mode of operation. The bubble point, mean flow pore (MFP) size, and pore size distribution were calculated from the curves and reported by the instrument. The pore size distribution was reported as the percentage of flow passing through pores within the size range specified and the results were summarized in a histogram. For each sample, three (3) tests were conducted and the results were averaged and reported.

Filtration Performance Test—VDI Test Method

For clean and unused filtration media, the filtration performance was tested according to VDI 3926 Part 1 "Standard Test for the Evaluation of Cleanable Filter Media," published in October 2004. Briefly, a fabric sample of 15 cm in diameter was placed in the sample holder and underwent the specified filtration, cleaning, and aging cycles. After the aging cycles, key performance parameters such as dust leakage, average pressure drop, and pulsing cycle time were measured and reported for the last five (5) cycles of the performance testing phase.

To determine the performance of used filtration media retrieved from the bag house after a certain period of field use, a "Special VDI Test" was developed using the same test apparatus as in the VDI 3926 Test Method. A fabric sample of 15 cm in diameter was cut out from the used filter bag and placed in the sample holder. The "field-aged" fabric sample then underwent 30 normal filtration cycles on the laboratory test apparatus. Key performance parameters such as dust leakage, pressure drop, and pulsing cycle time were measured and reported for the last five (5) cycles. This test provides useful data on how the fabric would perform in the field by simulating the field use conditions in the laboratory.

EXAMPLES

Example 1

Spunlaced Filtration Structure of Meta-aramid Fiber

Spunlaced fabric of meta-aramid fibers was prepared by processing 250 kg of NOMEX® meta-aramid fiber (DuPont Type 450) in a conventional opener, feeding system and then air-transported to the bottom and top cards. The card webs were compiled to the desired weights prior to entering the hydrolacing equipment. The hydrolacing equipment was equipped with 7 water jet heads, having a pressure range of up to 200 bar each. The hydrolacing process was conducted at a speed of around 5 m/minute and the fabric made had a basis weight of 381 grams per square meter.

Example 2

Spunlaced Filtration Structure of Blended Meta- and Para-aramid Fibers

A spunlaced filtration structure was made following the procedure described in Example 1 except for the fibers being a blend of 75 wt % meta-aramid and 25 wt % para-aramid fibers. The fabric made had a basis weight of 333 grams per square meter.

Comparative Examples 3-4

Comparative example 3 was a needle felt made of meta-aramid fiber. It had a basis weight of 460 g/m2. Comparative Example 4 was a needle felt made of a blend of 75 wt % meta-aramid and 25 wt % para-aramid fibers. The fabric basis weight was 450 g/m2.

The pore size distribution of Example 2 and Comparative Examples 3-4 was measured per procedure described earlier. The results are shown in Table 1. The spunlaced structure in Example 2 clearly gives more uniform pore size distribution, with 65% population between 10 micron to 26 micron, and no population at below 2 micron or above 46 micron. While for Comparative Examples 3 and 4, the populations between 10 micron to 26 micron are 49.7% and 49.4%, and the populations above 50 micron are 1.8% and 0.5%, respectively.

TABLE 1

Pore Size Distribution of Aramid Filtration Media

| Pore size range (micron) | Example 2 Spunlace | Comparative Example 3 Needle Punch | Comparative Example 4 Needle Punch |
|---|---|---|---|
| 0 to 2 | 0.0 | 2.8 | 2.8 |
| 2 to 6 | 6.4 | 6.8 | 7.8 |
| 6 to 10 | 11.7 | 9.4 | 11.5 |
| 10 to 14 | 14.1 | 13.4 | 13.3 |
| 14 to 18 | 18.1 | 12.3 | 9.3 |
| 18 to 22 | 18.0 | 14.5 | 17.8 |
| 22 to 26 | 14.8 | 9.5 | 9.0 |
| 26 to 30 | 5.8 | 7.1 | 4.9 |
| 30 to 34 | 3.9 | 6.2 | 6.4 |
| 34 to 38 | 3.8 | 4.7 | 4.5 |
| 38 to 42 | 2.3 | 2.5 | 2.3 |
| 42 to 46 | 0.5 | 2.2 | 2.6 |
| 46 to 50 | 0.0 | 2.6 | 4.2 |
| 50 to 54 | 0.0 | 1.8 | 0.5 |
| 54 to 58 | 0.0 | 0.0 | 0.0 |
| Sum of 10 to 26 | 65.0 | 49.7 | 49.4 |
| Above 50 | 0.0 | 1.8 | 0.5 |

The VDI test results for these four (4) examples are shown in Table 2. In order to compare dust leakage results at different basis weight, it is necessary to calculate the filtration mass efficiency for each sample. The fractional penetration is calculated by dividing the dust leakage with the upstream dust concentration of 5 g/m3. Due to the logarithmic nature in filtration, the filtration mass efficiency is calculated by dividing negative log(fractional penetration) by the fabric basis weight. Our results have showed that for the same structure of different basis weight, the filtration mass efficiency remains constant. The current results show that for the same fiber compositions, Examples 1 and 2 give higher filtration mass efficiency than Comparative Examples 3 and 4.

TABLE 2

VDI Test Results of Aramid Filtration Media

|  | Example 1 | Example 2 | Comparative Example 3 | Comparative Example 4 |
|---|---|---|---|---|
| Basis Weight, g/m2 | 381 | 333 | 460 | 505 |
| Dust Leakage, mg/m3 | 0.37 | 0.23 | 0.45 | 0.11 |
| Fractional Penetration | 0.000074 | 0.000046 | 0.000090 | 0.000022 |
| Filtration mass efficiency | 0.0108 | 0.0130 | 0.0088 | 0.0092 |
| Pressure Drop, Pa | 218 | 283 | 157 | 294 |
| Pulsing Cycle Time, s | 247 | 223 | 272 | 110 |

Example 5

Spunlaced Filtration Structure of Polyphenylene Sulfide Fiber

A spunlaced filtration structure was made following the procedure described in Example 1 except for the fibers being polyphenylene sulfide fibers. The fabric made had a basis weight of 430 grams per square meter.

Comparative Example 6

Comparative example 6 was a needle felt made of PPS fiber and supported on PPS scrim. The total basis weight was 550 g/m2.

Comparative Examples 7

Comparative example 7 was a PTFE membrane supported on a needle felt as described in Comparative Example 6. For pore size distribution measurement, a substitution was made with a PTFE membrane supported on a needle felt made of meta-aramid fiber. It is anticipated that the PSD for this type of filtration media is dominated by the membrane so the results should be very similar.

The pore size distribution of these three (3) samples was measured using the procedure described above and the results are shown in Table 3. The spunlace sample in Example 5 gives very uniform pore size distribution, having 60.1% population between pore size range of 10 micron to 26 micron and 0% above 34 micron. The needle punch sample in Comparative Example 6 is less uniform with 48.9% population between 10 micron and 26 micron and 3.8% population above 50 micron. The PTFE membrane sample in Comparative Example 7 has 80.1% population below 2 micron pore size but it has a second shallow but very broad pore structure which could be as large as 50 micron. This phenomenon is commonly observed for the membrane materials and is likely caused by imperfection in the membrane and substrate lamination process. It is believed that the broad pore size distribution is detrimental to the filtration performance as evidenced below.

TABLE 3

Pore Size Distribution of PPS Filtration Media

| Pore size range (micron) | Example 5 Spunlace | Comparative Example 6 Needle Punch | Comparative Example 7 PTFE Membrane |
|---|---|---|---|
| 0 to 2 | 0.0 | 0.0 | 80.1 |
| 2 to 6 | 8.6 | 8.6 | 0.0 |
| 6 to 10 | 19.9 | 10.8 | 1.2 |
| 10 to 14 | 26.2 | 11.6 | 2.2 |
| 14 to 18 | 18.9 | 12.7 | 2.1 |
| 18 to 22 | 9.1 | 9.4 | 2.3 |
| 22 to 26 | 5.9 | 15.2 | 2.3 |
| 26 to 30 | 5.7 | 7.8 | 2.3 |
| 30 to 34 | 3.1 | 7.1 | 1.5 |
| 34 to 38 | 0.0 | 5.6 | 1.8 |
| 38 to 42 | 0.0 | 4.2 | 1.1 |
| 42 to 46 | 0.0 | 1.4 | 1.1 |
| 46 to 50 | 0.0 | 1.3 | 0.8 |
| 50 to 54 | 0.0 | 2.2 | 0.0 |
| 54 to 58 | 0.0 | 1.4 | 0.0 |
| 58 to 62 | 0.0 | 0.2 | 0.0 |

TABLE 3-continued

Pore Size Distribution of PPS Filtration Media

| Pore size range (micron) | Example 5 Spunlace | Comparative Example 6 Needle Punch | Comparative Example 7 PTFE Membrane |
| --- | --- | --- | --- |
| Sum of 10 to 26 | 60.1 | 48.9 | 9.0 |
| Above 50 | 0.0 | 3.8 | 0.0 |

Filter bags were made from filtration media described in Example 5 and Comparative Examples 6 and 7. The bags were installed in a bag house of a coal-fired boiler power plant and underwent normal field operation. Bags were retrieved from the field after 2.5 months and 11 months for the "Special VDI Test" evaluation. The results are shown in Table 4. The spunlace fabric is Example 5 gives lower dust leakage (i.e. higher filtration efficiency) AND lower pressure drop versus the PTFE membrane in Comparative Example 7. This is surprising result as fabric with higher filtration efficiency usually gives higher pressure drop. In addition, the spunlace fabric gives longer pulsing cycle time which reduces number of pulsing cycles and energy consumption as well as physical damage to the filter bags. The needle punch sample in Comparative Example 6 gives much higher dust leakage, although the pressure drop was lower.

The excellent filtration performance by the spunlace fabric can be attributed to the uniform pore size distribution which results in uniform dust cake formation and gas flow. Structures with large pores will continue to experience dust leaking, even if dust cake has formed in the small pores. The present invention has proved that such leakage is very detrimental to achieving high filtration efficiency and low pressure drop.

TABLE 4

Special VDI Test Results of PPS Filtration Media after Field Use

| | Example 5 Spunlace | Comparative Example 6 Needle Punch | Comparative Example 7 PTFE Membrane |
| --- | --- | --- | --- |
| Basis Weight, g/m2 | 430 | 550 | 550 |
| Dust Leakage, mg/m3 (2.5 month) | 0.47 | 0.98 | 0.72 |
| Dust Leakage, mg/m3 (11 month) | 0.05 | 0.71 | 0.10 |
| Pressure Drop, Pa (2.5 month) | 93 | 76 | 168 |
| Pressure Drop, Pa (11 month) | 136 | 76 | 244 |
| Pulsing Cycle Time, s (2.5 month) | 338 | 249 | 231 |

What is claimed is:

1. A bag filter having a tubular section, one closed end and one open end, the tubular section consisting of a nonwoven mat wherein the mat is characterized by a pore size distribution in which the number of pores in a given range as measured by ASTM F316-03 test method is plotted against pore size and the percentage of pores having a size in between 10 and 26 microns is greater than 50% while the percentage of pores having a size of greater than 50 microns is less than 0.5%, wherein the mat is formed from spunlaced discontinuous fibers and wherein the fibers are aramid, polyarylene sulfide or both.

* * * * *